(12) United States Patent
Jain et al.

(10) Patent No.: US 10,284,436 B2
(45) Date of Patent: May 7, 2019

(54) CLOUD BASED WAKE-ON-LAN FOR THIN CLIENTS

(71) Applicant: Wyse Technology L.L.C., Santa Clara, CA (US)

(72) Inventors: Shailesh Jain, Bangalore (IN); Prashanth Devendrappa, Bangalore (IN); Satya Mylvara, Sunnyvale, CA (US); Ngoc Pham, San Jose, CA (US)

(73) Assignee: Wyse Technology L.L.C., Santa Clara, CA (US)

( * ) Notice: Subject to any disclaimer, the term of this patent is extended or adjusted under 35 U.S.C. 154(b) by 231 days.

(21) Appl. No.: 15/135,269

(22) Filed: Apr. 21, 2016

(65) Prior Publication Data

US 2017/0310559 A1    Oct. 26, 2017

(51) Int. Cl.
| | | |
|---|---|---|
| *G06F 15/173* | (2006.01) | |
| *H04L 12/24* | (2006.01) | |
| *H04L 29/08* | (2006.01) | |
| *H04L 29/12* | (2006.01) | |
| *H04L 12/741* | (2013.01) | |

(52) U.S. Cl.
CPC ............ *H04L 41/26* (2013.01); *H04L 41/082* (2013.01); *H04L 67/10* (2013.01); *H04L 67/32* (2013.01); *H04L 41/046* (2013.01); *H04L 45/74* (2013.01); *H04L 61/103* (2013.01); *H04L 61/2007* (2013.01); *H04L 61/2503* (2013.01); *H04L 61/6022* (2013.01)

(58) Field of Classification Search
CPC ......... H04L 41/26; H04L 45/74; H04L 67/10; H04L 67/32; H04L 61/2007; H04L 61/2503; H04L 61/6022; H04L 41/046; H04L 41/082; H04L 61/103
USPC .......... 709/217, 223, 245; 713/310; 370/392
See application file for complete search history.

(56) References Cited

U.S. PATENT DOCUMENTS

| | | | | |
|---|---|---|---|---|
| 2004/0246961 | A1* | 12/2004 | Dai ........................ | H04L 12/12 370/392 |
| 2005/0131556 | A1* | 6/2005 | Trappeniers ............ | H04L 12/12 700/22 |
| 2007/0070998 | A1* | 3/2007 | Sethuram ................ | H04L 12/12 370/389 |
| 2008/0170569 | A1* | 7/2008 | Garg ....................... | H04L 12/12 370/390 |
| 2009/0161667 | A1* | 6/2009 | Kern ....................... | H04L 12/12 370/389 |
| 2012/0057503 | A1* | 3/2012 | Ding ...................... | H04W 24/04 370/254 |
| 2013/0132745 | A1* | 5/2013 | Schoening ............. | G06F 1/3209 713/310 |
| 2015/0039917 | A1* | 2/2015 | Morikawa ................ | G06F 1/32 713/310 |

(Continued)

*Primary Examiner* — Liang Che A Wang
*Assistant Examiner* — Johnny B Aguiar
(74) *Attorney, Agent, or Firm* — Kirton McConkie; Brian Tucker (57) ABSTRACT

Cloud based Wake-on-LAN (WoL) for thin clients can be performed to allow a cloud based management server to wake up a thin client prior to an update command (or other communication) being transmitted to the thin client to ensure that the thin client will receive the update command. Cloud based WoL can therefore facilitate the deployment of updates to thin clients by providing a way for the administrator to wake up the thin clients from the cloud.

19 Claims, 12 Drawing Sheets

(56) References Cited

U.S. PATENT DOCUMENTS

2016/0056968 A1* 2/2016 Lee .................. H04L 12/12
370/338

* cited by examiner

CLOUD BASED WAKE-ON-LAN FOR THIN CLIENTS

CROSS-REFERENCE TO RELATED APPLICATIONS

N/A

BACKGROUND

A number of different device management platforms exist including, for example, Dell's Cloud Client Manager. These device management platforms can allow a number of different types of devices, including, for example, thin clients, zero clients, tablets, and smartphones, to be monitored and managed from a single location (i.e., from a management server in the cloud). To allow this monitoring and management, a device agent is installed on each device so that the management server can communicate with the device agent to implement a desired type of monitoring or management. Such devices will hereafter be referred to as "managed devices."

Sometimes, it may be desirable to update a managed device. To do so, an administrator will typically employ a user interface of the management server to specify which device(s) to update and which update to supply to the device(s). While being updated, the managed device will oftentimes experience some downtime, especially in cases where the update is a new image. For this reason, an administrator may oftentimes schedule the deployment of an update after hours or over the weekend so as to not limit a user's productivity.

Because the update command is transmitted over the network to the managed device, it is necessary that the managed device be turned on in order to receive the update command and, in response, initiate the update. However, many managed devices are configured to transition into a sleep or other lower power state after a certain period of inactivity (e.g., ten minutes). Therefore, if an update is scheduled to be deployed outside of typical work hours, it is likely that the target managed device(s) will not be awake when the update command is transmitted. In this scenario, the managed device typically will not receive the update command and initiate the update until the user returns to work and awakens the device. As a result, the update will be deployed while the user is trying to work thereby thwarting the administrator's intentions to deploy the update after hours.

Wake-on-LAN (WoL) is an industry standard protocol for waking computers from a lower power mode. To implement WoL, the network card of the device must be powered so that it can monitor for a "magic packet." The magic packet is a broadcast frame that includes a payload of FF FF FF FF FF FF followed by sixteen repetitions of the target device's MAC address. When the network card receives a magic packet, it can cause the device to turn on.

Because WoL works at the data link layer (i.e., because it employs MAC addresses), the sender of the magic packet must be on the same LAN as the device to be awakened. More particularly, because the device to be awakened is not executing, it will not have an IP address to which a magic packet can be routed. However, various techniques have been developed to allow a magic packet to be sent to a device over the internet. For example, a UDP packet containing a magic packet in its payload can be sent from a WoL utility over the internet towards the device to be awakened. When the router on the device's LAN receives the UDP packet, it can be configured to implement port forwarding to thereby broadcast the UDP packet over the LAN. The NIC of the device would therefore receive the packet and can examine its payload for a magic packet containing the NIC's MAC address. Although this technique enables WoL over the internet, it requires the router to be specifically configured to properly route WoL packets. Such configuration can create security concerns (e.g., by creating a hole in the firewall) and is therefore not desirable.

BRIEF SUMMARY

The present invention extends to methods, systems, and computer program products for performing cloud based Wake-on-LAN (WoL) for managed devices generally, and particularly for thin clients. Cloud based WoL can be performed to allow a cloud based management server to wake up a thin client prior to an update command (or other communication) being transmitted to the thin client to ensure that the thin client will receive the update command. Cloud based WoL can therefore facilitate the deployment of updates to thin clients by providing a way for the administrator to wake up the thin clients from the cloud.

In some embodiments, the present invention can be implemented as a method for performing cloud based WoL. A cloud based management server can receive input identifying one or more managed devices to be awakened. The management server can obtain a MAC address and an IP address for each managed device to be awakened. The management server can send a WoL request to an on-premise server associated with the one or more managed devices to be awakened. The WoL request includes the MAC address and the IP address of each of the one or more managed devices. The on-premise server can generate a magic packet for each of the one or more managed devices. The on-premise server can employ the IP address of each of the one or more managed devices to route the corresponding magic packet to the managed device thereby causing the managed device to awaken and check in with the management server.

In another embodiment, the present invention can be implemented as a method for performing cloud based WoL. A cloud based management server can receive input identifying one or more managed devices to be awakened. The management server can obtain a MAC address and an IP address for each managed device to be awakened. The management server can also identify an active managed device that is in the same subnet as each of the one or more managed devices. The management server can then send a WoL request to the active managed device. The WoL request can include the MAC address and the IP address of each of the one or more managed devices. The active managed device can generate a magic packet for each of the one or more managed devices and then send the magic packets over the subnet to awaken the one or more managed devices.

In another embodiment, the present invention can be implemented as a device management platform for enabling cloud based WoL. The platform can include: a cloud based management server configured to allow an administrator to manage a tenant's managed devices from the cloud; a first on-premise server in communication with the management server; and a device agent configured to execute on each of the tenant's managed devices. In response to input from the administrator requesting that one or more of the managed devices be awakened, the management server is configured to send a WoL request to the on-premise server that identifies an IP address and a MAC address of each of the one or more managed devices. In response to receiving the WoL request, the first on-premise server is configured to generate a magic packet for each of the one or more managed devices and to route each magic packet for broadcasting over a subnet based on the IP address for the corresponding managed device.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
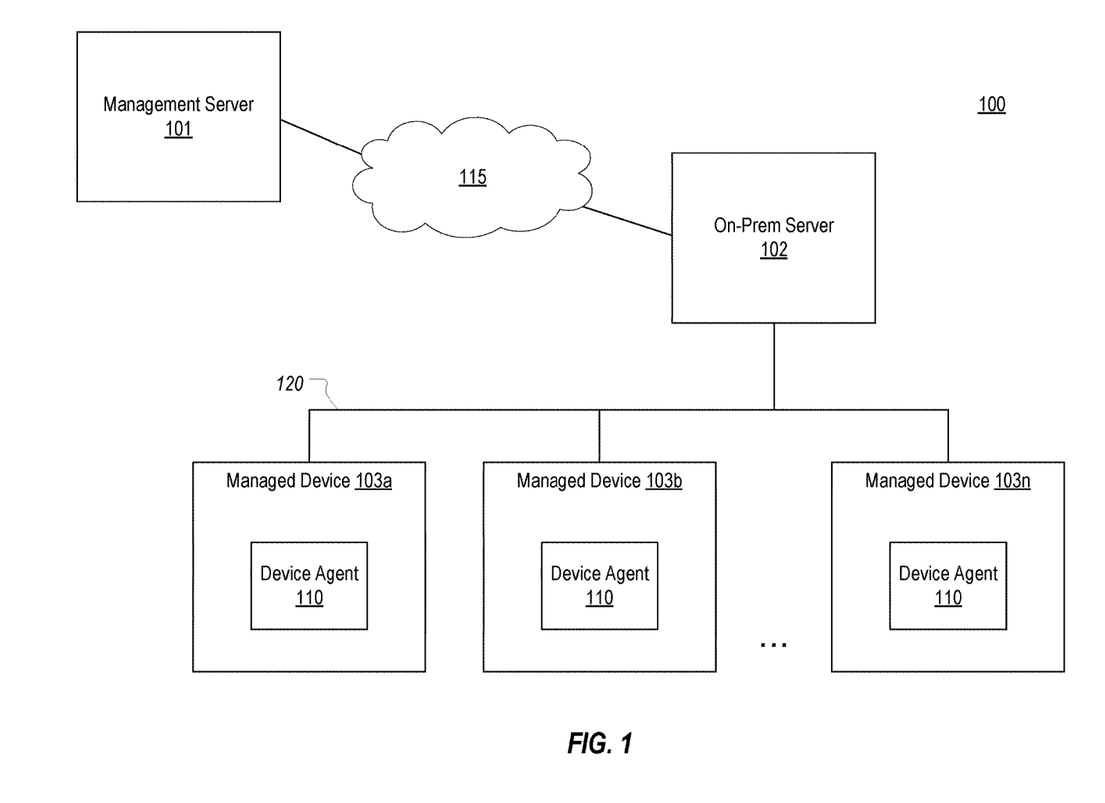
FIG. 1 illustrates an example computing environment in which the present invention can be implemented.

FIG. 1 provides a general illustration of the architecture of managed device environment 100. Managed device environment 100 includes a number of managed devices (e.g., thin clients) 103a-103n (where n represents any number) and an on-premise server 102 that are each coupled to a local area network 120 (e.g., on-premise server 102 and managed devices 103a-103n are all part of the same subnet). On-premise server 102 is connected to a cloud based management server 101 via the internet 115. Also, although not depicted in FIG. 1, each of managed devices 103a-103n can employ the internet 115 to communicate with management server 101.

As an example, a company may provide thin clients for its employees at a particular location and maintain an on-premise server at that location. An administrator of the company would then have access to management server 101 via the cloud for purposes of managing the company's thin clients at that location and possibly other locations. Similarly, other companies or entities may provide thin clients to their employees which are managed by their administrators via management server 101. Accordingly, management server 101 functions as software as a service to allow a large number of companies/entities to manage their devices.

To allow a device to be managed (whether thin client, mobile device, laptop, desktop, etc.), a device agent 110 can be installed on the device. Device agent 110 can be configured to register with and communicate with management server 101 as part of the device management process. The present invention is particularly applicable to thin clients since an administrator would typically desire to update the thin client's flash image when the thin client is not being used. In contrast, thick clients (e.g., desktop or laptops having full operating systems) and mobile devices would typically have other means for providing updates (e.g., Windows Update, Google Play, App Store, etc.). Therefore, the present invention will be described primarily with reference to thin clients. However, the invention should not be limited to use with any particular type of managed device.

As was described in the background, management server 101 cannot directly send a magic packet to any of managed devices 103a-103n since these managed devices are not in the same subnet as management server 101. As was also described in the background, a router on LAN 120 could possibly be configured to receive and broadcast WoL packets over LAN 120, but this creates security concerns and requires a large amount of overhead—especially considering that management server 101 may be used to manage devices on thousands of LANs.

In accordance with embodiments of the present invention, device management environment 100 can be configured to allow management server 101 to cause magic packets to be sent to any or all of managed devices 103a-103n in a safe and easy manner. The process by which magic packets can be sent from the cloud based management server 101 is generally depicted in FIGS. 2A-2F.

Figure 2A:
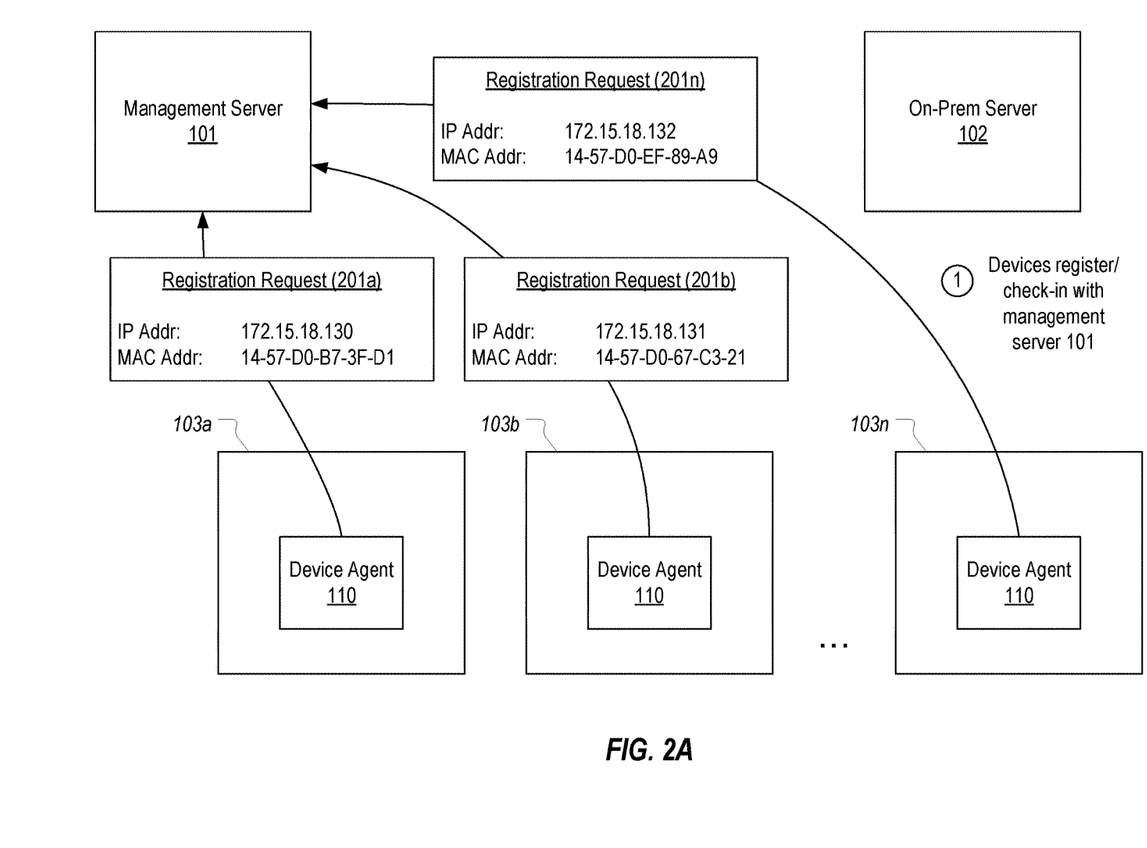
FIGS. 2A-2F illustrate how cloud based WoL can be implemented in some embodiments of the present invention when the managed devices to be awakened are associated with an on-premise server.

FIG. 2A illustrates a first step in which the device agent 110 on each managed device 103a-103n sends a registration request 201a-201n respectively to management server 101. These registration requests 201a-201n can include the managed device's IP address and MAC address among possibly many other types of information including, for example, a group token or other identifier that can be used to associate each managed device with a particular tenant (e.g., a particular company). Management server 101 employs these registration requests to maintain a list of each tenant's managed devices so that, when an administrator of the tenant logs into management server 101, management server 101 can present information about the tenant's managed devices. Although not depicted in FIG. 2A, on-premise server 102 can also be registered with management server 101 so that management server 101 is aware that on-premise server 102 is part of the same network 120 as managed devices 103a-103n (e.g., by supplying the same group token).

Figure 2B:
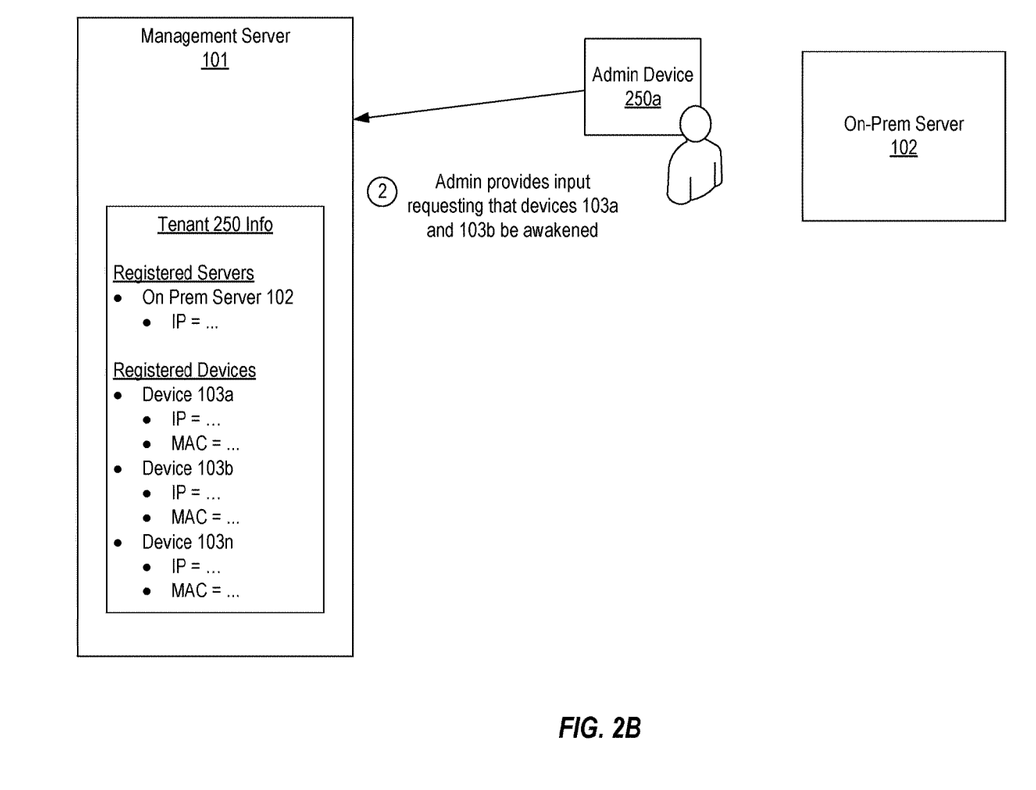

For purposes of this example, it will be assumed that on-premise server 102 and managed devices 103a-103n are each registered under tenant 250's account. As shown in FIG. 2B, management server 101 therefore maintains information about each of tenant 250's registered devices including on-premise server 102. FIG. 2B also illustrates that an administrator of tenant 250 employs an administrator device 250a to access management server 101 (e.g., via a browser over the internet). By logging into management server 101 using tenant 250's credentials, the administrator will be presented with information about each of managed devices 103a-103n (including a status of the devices). The administrator can also be presented with various options for managing these devices including the option to wake any or all of the managed devices. Therefore, FIG. 2B depicts a second step in which the administrator provides input requesting that devices 103a and 103b be awakened. As an example, the administrator may provide this input prior to deploying an update command to these devices to thereby ensure that the devices are awake to receive the command.

Figure 2C:
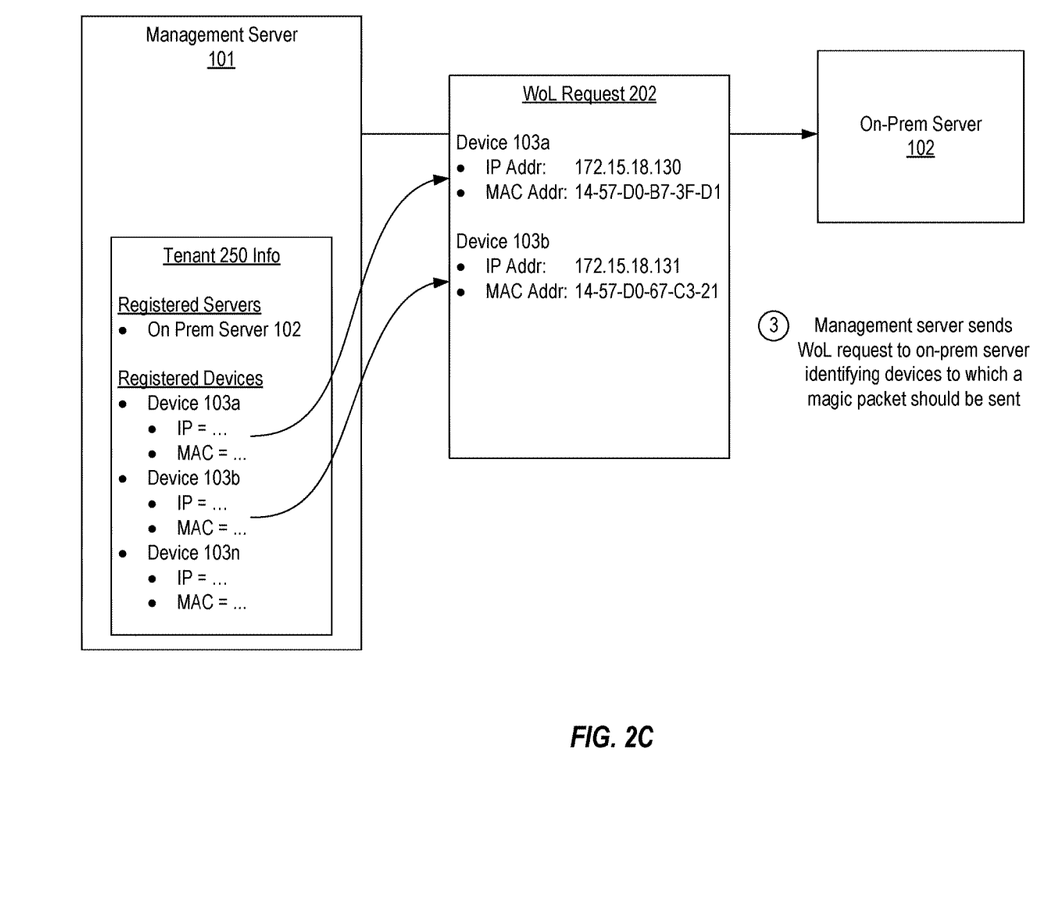

As represented in a third step in FIG. 2C, in response to this input from the administrator, management server 101 can employ the information it maintains about devices 103a and 103b to populate and send a WoL request 202 to on-premise server 102. It is noted that WoL request 202 does not constitute a WoL magic packet or packets. Instead, WoL request 202 comprises a request for on-premise server 102 to cause a magic packet to be sent to each device identified in WoL request 202 using the information contained in WoL request 202. In particular, because the administrator has requested that devices 103a and 103b be awakened, management server 101 has obtained device 103a's and device 103b's IP address and MAC address.

WoL request 202 can include the IP address of each device that is to receive a magic packet to allow on-premise server 102 to identify on which subnet to broadcast the magic packet for that device. In particular, in most configurations, a tenant will have managed devices on multiple subnets. However, magic packets are not propagated across subnets. It is therefore necessary that a magic packet for a particular device be broadcast over the subnet to which the device is connected. As will be further described below, on-premise server 102 can employ the IP address of the device to identify the appropriate subnet and then cause the magic packet to be broadcast over that subnet (e.g., by routing an appropriate request to the router/switch on that subnet).

Figure 2D:
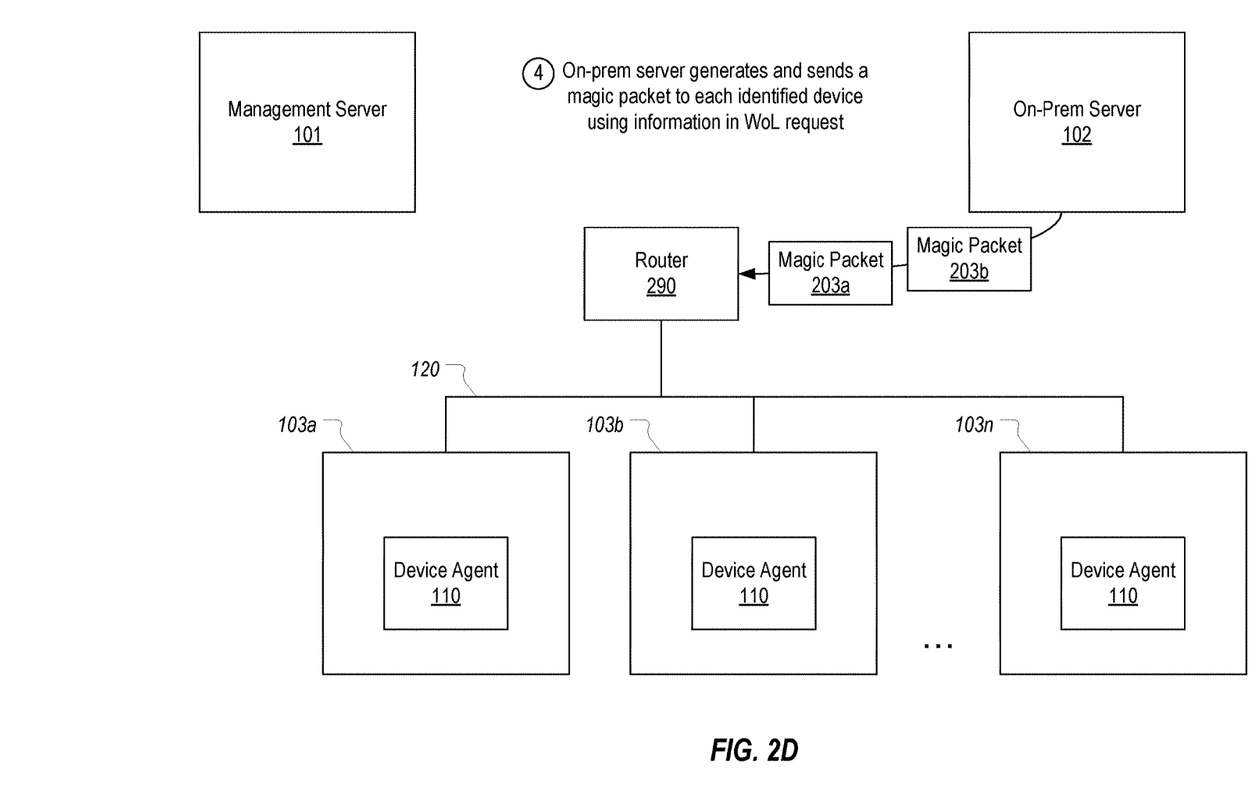
Figure 2E:
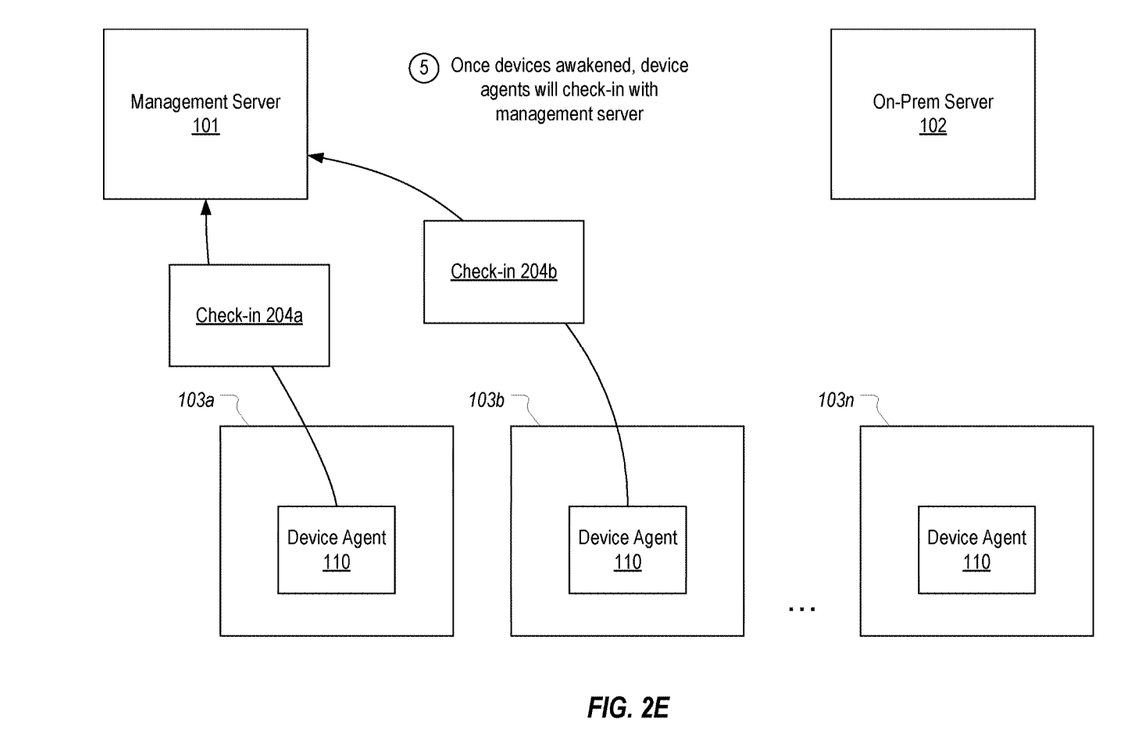

In response to receiving WoL request 202 and as represented as a fourth step in FIG. 2D, on-premise server 102 can identify which devices are specified in the request and generate magic packets for each of these devices. For example, on-premise server 102 can process WoL request 202 to determine that a magic packet should be sent to managed device 103a. Using the IP address for managed device 103a that is specified in WoL request 202 (which will be the IP address most recently reported by managed device 103a to management server 101), on-premise server 102 can determine which subnet managed device 103a is on. On-premise server 102 can also extract managed device 103a's MAC address and create an appropriately configured magic packet 203a containing this MAC address. Magic packet 203a can then be sent to router 290 for broadcast over the appropriate subnet. For example, magic packet 203a can be in the payload of an IP packet sent to IP address 172.15.18.255 (which may also specify a MAC broadcast address of FF:FF:FF:FF:FF:FF). Because 172.15.18.255 is a broadcast address, router 290 would cause magic packet 203a to be broadcast over network 120 thereby causing managed device 103a's NIC to receive magic packet 203a.

On-premise server 102 can similarly identify that a magic packet should be sent to managed device 103b and can generate and send magic packet 203b accordingly. In FIG. 2D, it is assumed that managed device 103b is in the same subnet as managed device 103a, and therefore, magic packet 203b can be sent to router 290 for broadcast over the subnet. However, if managed device 103b were on a different subnet than managed device 103a, which could be determined using the IP address of managed device 103b specified in WoL request 202, on-premise server 102 could send magic packet 203b to the appropriate router for that subnet. Accordingly, on-premise server 102 employs the IP address of the device to be awakened to determine how to route a magic packet to cause the magic packet to be broadcast over the appropriate subnet.

When the NICs of devices 103a and 103b receive magic packets 203a and 203b respectively, devices 103a and 103b will be awakened. Once awakened, device agent 110 on each device can send a check-in 204a and 204b respectively to management server 101 as represented as a fifth step in FIG. 2E. Management server 101 will therefore be informed that devices 103a and 103b are awake and can receive commands.

Figure 2F:
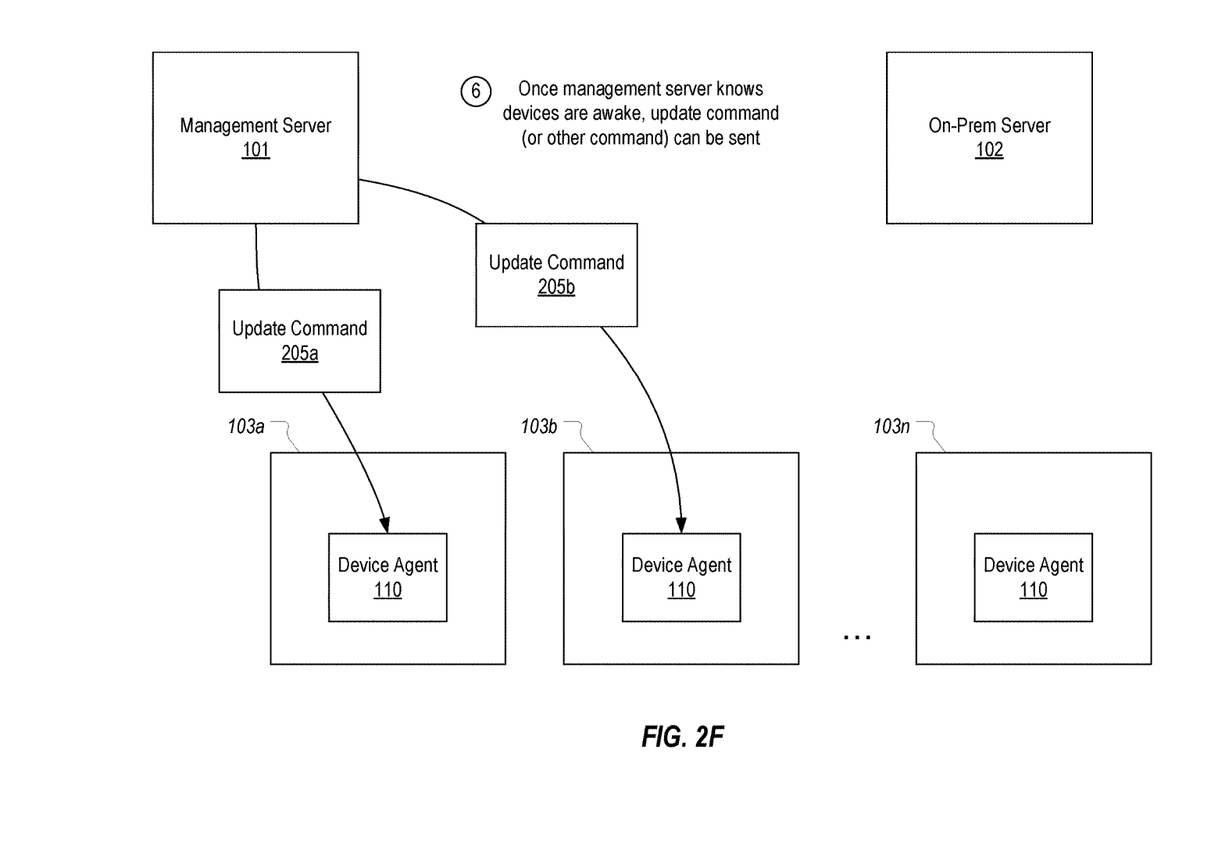

Once managed devices 103a and 103b are awake, management server 101 can send any appropriate command to the devices. For example, as shown in FIG. 2F as a sixth step, management server 101 can send update commands 205a and 205b to the device agent 110 on managed devices 103a and 103b respectively (e.g., using a socket created by the devices as part of checking in). In some embodiments, management server 101 may be configured to automatically send update commands 205a and 205b in response to check-in 204a and 204b respectively. In particular, management server 101 may allow an administrator to request the deployment of an update and to specify that the command to obtain the update should only be issued after management server 101 has caused a magic packet to be sent to the devices to be updated. In this way, the administrator can ensure that the devices will be awake at the time when the update is scheduled to be deployed (e.g., late at night or over the weekend).

The above-described process can be employed to enable an administrator to awaken any or all of a tenant's managed devices. For example, management server 101 can provide an option to awaken one or more specified devices, a specified group of devices, or even all of the tenant's devices. When the tenant has only one registered on-premise server, a WoL request containing information for each device to be awakened can be sent to that on-premise server in the manner described above. However, in some cases, a tenant may have multiple locations that each include an on-premise server. In such cases, it may be necessary to send a WoL request to more than one of the tenant's on-premise servers.

Figure 3:
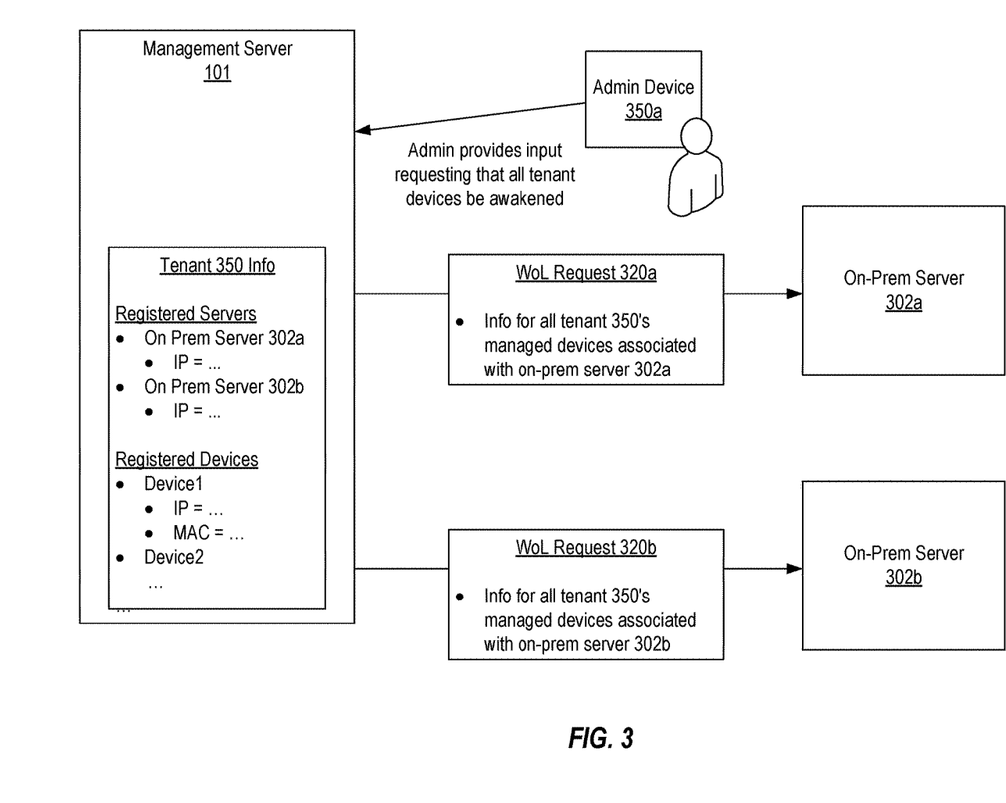
FIG. 3 illustrates how the management server can send multiple WoL requests when a tenant has more than one on-premise server.

FIG. 3 represents a case where a tenant 350 has registered two on-premise servers 302a and 302b each of which is associated with a number of managed devices. As shown, management server 101 can maintain information about tenant 350's on-premise servers and managed devices which could have been obtained through the registration process described above. FIG. 3 depicts that an administrator of tenant 350 provides input requesting that all of tenant 350's managed devices be awakened (e.g., by providing input via a browser on 350a).

Upon receiving this request, management server 101 can access tenant 350's information to determine that there are two registered on-premise servers 302a and 302b for the tenant. In response, management server 101 can generate WoL requests 320a and 320b for each of these on-premise servers. Management server 101 can include in WoL request 320a device information for each device that is associated with on-premise server 302a. Similarly, management server 101 can include in WoL request 320b device information for each device that is associated with on-premise server 302b. As described above, this device information can include both the MAC address and the last known IP address for the device to allow the on-premise server to determine where to broadcast a magic packet.

In some embodiments, the cloud based WoL of the present invention can be implemented even without a dedicated on-premise server. For example, in some embodiments, when an administrator requests that a managed device be awakened, management server 101 can identify a peer managed device (i.e., a managed device on the same subnet as the device to be awakened) that is currently awake, and can send a WoL request to the peer managed device thereby requesting that the peer managed device send a magic packet to the device to be awakened.

Figure 4A:
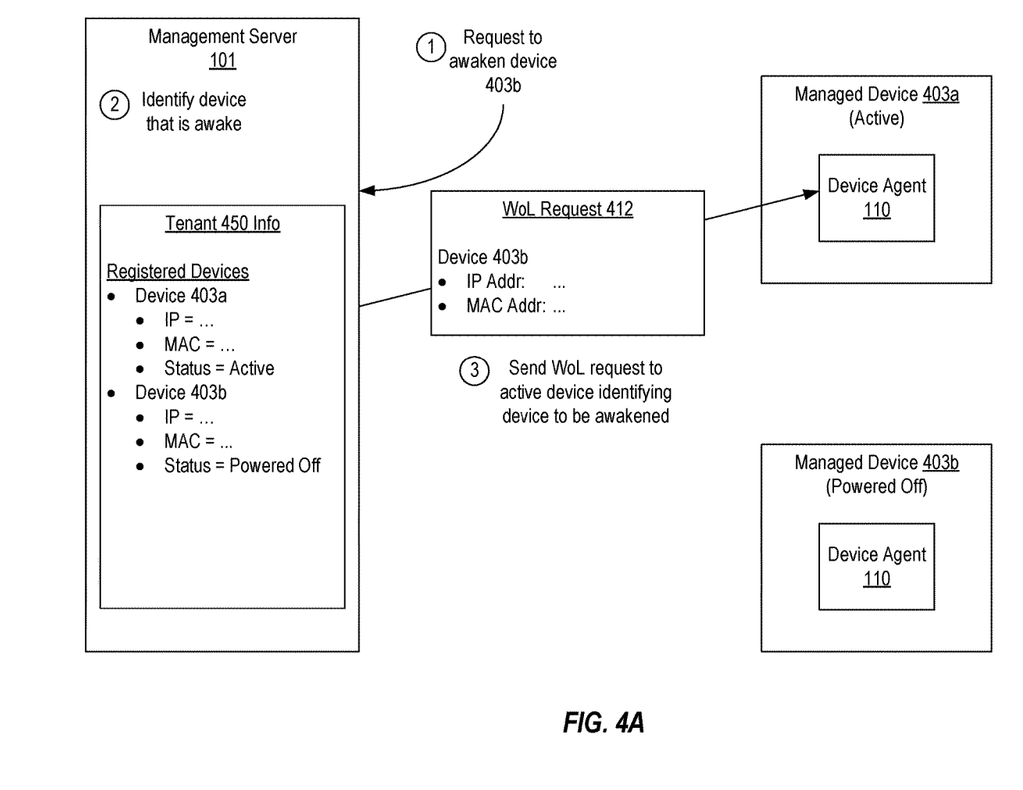
FIGS. 4A and 4B illustrate how cloud based WoL can be implemented without employing an on-premise server.
Figure 4B:
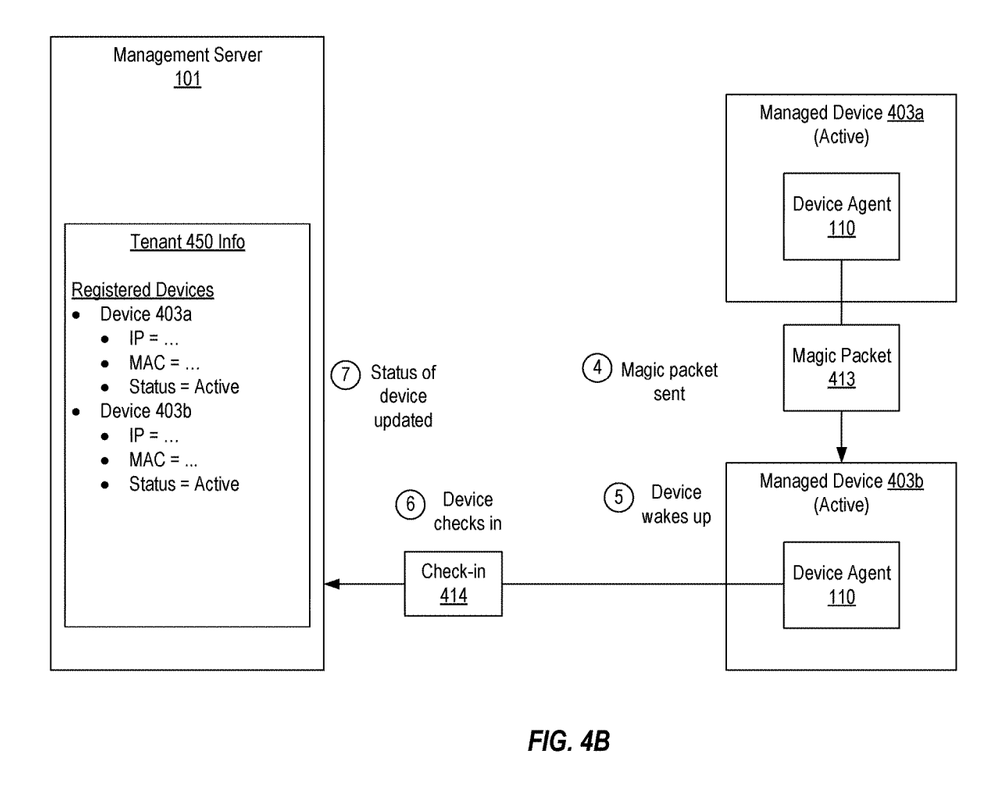

FIGS. 4A and 4B generally illustrate this process being implemented to awaken one of tenant 450's devices. In step 1, management server 101 receives a request to awaken device 403b. This request could be received from an administrator as described above. This request could equally specify that more than one or all of tenant 450's devices be awakened. In step 2, management server 101 can identify whether any of tenant 450's devices that are in the same subnet as device 403b are awake. In some embodiments, this step could be performed after management server 101 determines that there is no on-premise server on the same subnet as device 403b. As indicated in the information maintained by management server 101, device 403a has a status of awake. This awake status could be based on management server 101 having recently received a check-in from device 403a. Similarly, the information indicates that device 403b has a status of powered off which could be based on management server 101 not having received a check-in from device 403b for a specified amount of time. Management server 101 can determine that device 403a is awake and is in the same subnet as device 403b (e.g., by determining that the two devices share the same IP prefix or based on any other maintained information that defines the subnet to which each device belongs).

In step 3, management server 101 sends WoL request 412 to the device agent 110 on managed device 403a. As described above, this WoL request can include the information necessary for the device agent 110 to generate and send a magic packet to any specified device which in this case is managed device 403b. Next, as shown in step 4 of FIG. 4B, device agent 110 on managed device 403a sends magic packet 413 to managed device 403b (or, more particularly, to managed device 403b's NIC). In response, managed device 403b will awaken in step 5 and check-in 414 with management server 101 in step 6. Finally, management server 101 can update the status of device 403b to awake in step 7. At this point, managed device 403b could be selected to receive a WoL request for the purposes of waking up another device on the same subnet.

As can be seen, the present invention enables an administrator to quickly and easily awaken a managed device so that the device agent on the managed device will be able to receive a command or other communication pertaining to device management. The present invention is particularly beneficial for awakening devices to receive an update at times when most or all of the devices are likely to be powered off.

Considering a device management environment in which potentially thousands of thin clients are managed from the cloud based management server, the present invention can enable the administrator to ensure that all of the devices will be awake when they are commanded to obtain an update. Assuming the update command is scheduled to be sent out over the weekend when the thin clients are likely to be inactive and therefore powered off/down, without the techniques of the present invention, the device agents on the devices would not be able to receive the update command until Monday when the users return to work. However, by employing the techniques of the present invention, the administrator can instruct the management server to cause each device to receive a magic packet prior to the update command being sent to the device. Each device will therefore be awake and can proceed with the update at the desired time.

Figure 5:
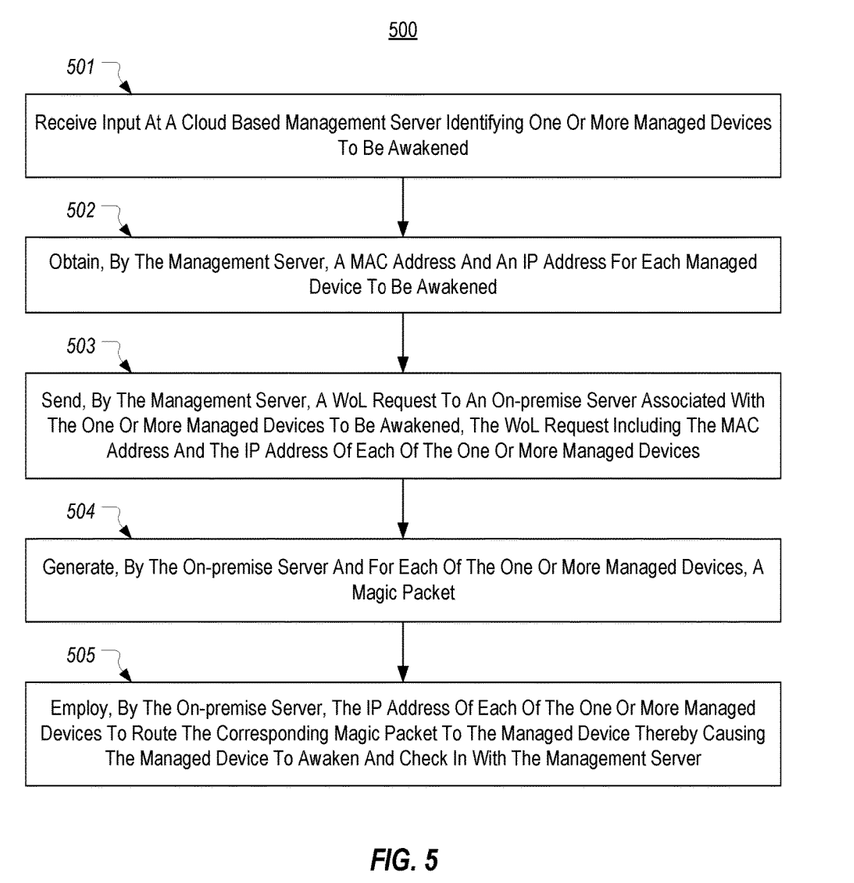
FIG. 5 illustrates a flowchart of an example method for performing cloud based WoL.

FIG. 5 illustrates a flowchart of an example method 500 for performing cloud based WoL. Method 500 will be described with reference to FIGS. 2A-2F.

Method 500 includes an act 501 of receiving input at a cloud based management server identifying one or more managed devices to be awakened. For example, an administrator of tenant 250 can provide input requesting that managed devices 103a and 103b be awakened.

Method 500 includes an act 502 of obtaining, by the management server, a MAC address and an IP address for each managed device to be awakened. For example, management server 101 can obtain a MAC address and IP address for each of managed devices 103a and 103b from information that the management server has compiled about tenant 250's managed devices.

Method 500 includes an act 503 of sending, by the management server, a WoL request to an on-premise server associated with the one or more managed devices to be awakened, the WoL request including the MAC address and the IP address of each of the one or more managed devices. For example, management server 101 can send WoL request 202.

Method 500 includes an acct 504 of generating, by the on-premise server and for each of the one or more managed devices, a magic packet. For example, on-premise server 102 can generate magic packets 203a and 203b.

Method 500 includes an act 505 of employing, by the on-premise server, the IP address of each of the one or more managed devices to route the corresponding magic packet to the managed device thereby causing the managed device to awaken and check in with the management server. For example, on-premise server 102 can employ the IP addresses of managed devices 103a and 103b, which were provided in WoL request 202, to cause magic packets 203a and 203b to be routed to router 290 for broadcast over LAN 120.

Figure 6:
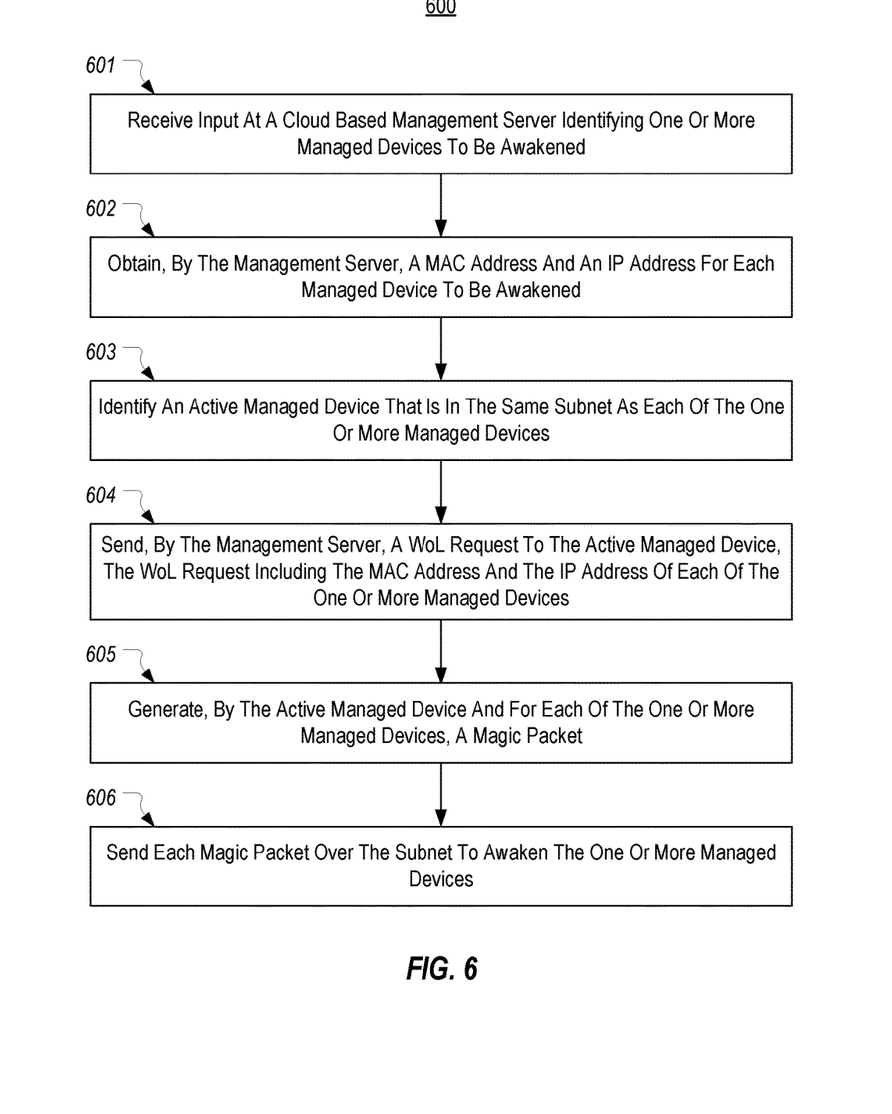
FIG. 6 illustrates a flowchart of another example method for performing cloud based WoL.

FIG. 6 illustrates a flowchart of an example method 600 for performing cloud based WoL. Method 600 will be described with reference to FIGS. 4A and 4B.

Method 600 includes an act 601 of receiving input at a cloud based management server identifying one or more managed devices to be awakened. For example, management server 101 can receive input requesting that device 403b be awakened.

Method 600 includes an act 602 of obtaining, by the management server, a MAC address and an IP address for each managed device to be awakened. For example, management server 101 can obtain the MAC address and IP address of managed device 403b.

Method 600 includes an act 603 of identifying an active managed device that is in the same subnet as each of the one or more managed devices. For example, management server 101 can identify that managed device 403a is in the same subnet as managed device 403b.

Method 600 includes an act 604 of sending, by the management server, a WoL request to the active managed device, the WoL request including the MAC address and the IP address of each of the one or more managed devices. For example, management server 101 can send WoL request 412 to device agent 110 on managed device 403a.

Method 600 includes an act 605 of generating, by the active managed device and for each of the one or more managed devices, a magic packet. For example, device agent 110 on managed device 403a can generate magic packet 413.

Method 600 includes an act 606 of sending each magic packet over the subnet to awaken the one or more managed devices. For example, device agent 110 on managed device 403a can send magic packet 413 to managed device 403b by broadcasting magic packet 413 over the subnet to which both managed devices pertain.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for performing cloud based wake-on-LAN (WoL) comprising:
receiving input at a cloud based management server from an administrator's device identifying a plurality of managed devices to be awakened;
obtaining, by the cloud based management server, a media access control (MAC) address and an internet protocol (IP) address for each of the plurality of managed devices to be awakened;
sending, by the cloud based management server, a WoL request to an on-premise server associated with each of the plurality of managed devices to be awakened, the WoL request including the MAC address and the IP address of each of the plurality of managed devices; and
in response to receiving the WoL request and for each of the plurality of managed devices:
generating, by the on-premise server, a magic packet that includes the MAC address of the managed device that was provided in the WoL request;
employing, by the on-premise server, the IP address of the managed device that was provided in the WoL request to identify a router in a same subnet as the managed device;
generating, by the on-premise server, an IP packet that contains the magic packet and that specifies a broadcast IP address in the same subnet; and
sending, by the on-premise server, the IP packet containing the magic packet to the identified router thereby causing the identified router to broadcast the magic packet over the same subnet and also causing the corresponding managed device to be awakened.

2. The method of claim 1, wherein the input identifies that all of a tenant's managed devices should be awakened such that the WoL request includes the MAC address and the IP address of all of the tenant's managed devices.

3. The method of claim 1, wherein the plurality of managed devices to be awakened comprises a first set of managed devices associated with a first on-premise server and a second set of managed devices associated with a second on-premise server, and
wherein sending the WoL request comprises sending a first WoL request to the first on-premise server and a second WoL request to the second on-premise server.

4. The method of claim 3, wherein the first WoL request includes the MAC address and IP address of each managed device in the first set and the second WoL request includes the MAC address and the IP address of each managed device in the second set.

5. The method of claim 1, wherein obtaining the MAC address and the IP address for each of the plurality of managed devices to be awakened comprises accessing device information previously received by the cloud based management server from each of the plurality of managed devices.

6. The method of claim 1, wherein the router comprises a switch.

7. The method of claim 1, wherein each of the plurality of managed devices is on the same subnet.

8. The method of claim 1, wherein the plurality of managed devices are on multiple subnets.

9. The method of claim 1, further comprising:
receiving, by the cloud based management server, a check-in from each of the plurality of managed devices; and
in response to each check-in, sending an update command to the managed device from which the check-in was received instructing the managed device from which the check-in was received to commence an update process.

10. A device management platform for enabling cloud based wake-on-LAN (WoL) comprising:

a cloud based management server configured to allow an administrator to manage a tenant's managed devices;
a first on-premise server in communication with the cloud based management server; and
a device agent configured to execute on each of the tenant's managed devices;
wherein, in response to receiving input from the administrator's device that requests that a plurality of managed devices of the tenant's managed devices be awakened, the cloud based management server is configured to send a WoL request to the first on-premise server that identifies an internet protocol (IP) address and a media access control (MAC) address of each of the plurality of managed devices; and
wherein, in response to receiving the WoL request, the first on-premise server is configured to perform the following for each of the plurality of managed devices:
generate a magic packet that includes the MAC address of the managed device that was provided in the WoL request;
employ the IP address of the managed device that was provided in the WoL request to identify a router in a same subnet as the managed device;
generate an IP packet that contains the magic packet and that specifies a broadcast IP address in the same subnet; and
send the IP packet containing the magic packet to the identified router thereby causing the identified router to broadcast the magic packet over the same subnet and also causing the corresponding managed device to be awakened.

11. The device management platform of claim 10, further comprising:
a second on-premise server in communication with the cloud based management server, the first and second on-premise servers both being registered to the tenant;
wherein the input from the administrator identifies a first set of managed devices associated with the first on-premise server and a second set of managed devices associated with the second on-premise server, the cloud based management server being configured to send a first WoL request to the first on-premise server that identifies the IP address and the MAC address of each of the managed devices in the first set and to send a second WoL request to the second on-premise server that identifies the IP address and the MAC address of each of the managed devices in the second set.

12. The device management platform of claim 10, wherein the device agent is configured to check in with the cloud based management server after the managed device on which the device agent executes receives the magic packet.

13. The device management platform of claim 12, wherein the cloud based management server is configured to send an update command to the device agent in response to the device agent checking in.

14. The device management platform of claim 10, wherein the cloud based management server is further configured to:
receive input identifying additional managed devices to be awakened;
obtaining a MAC address and an IP address for each of the additional managed devices to be awakened;
identify an active managed device that is in a same subnet as each of the additional managed devices; and
send an additional WoL request to the active managed device, the additional WoL request including the MAC address and the IP address of each of the additional managed devices;
wherein in response to receiving the additional WoL request, the device agent on the active managed device is configured to send a magic packet to each of the additional managed devices.

15. One or more computer storage media storing computer executable instructions which when executed implement a method for performing cloud based wake-on-LAN (WoL) comprising:
receiving input at a cloud based management server from an administrator's device identifying that all of a tenant's plurality of managed devices should be awakened;
obtaining, by the cloud based management server, a media access control (MAC) address and an internet protocol (IP) address for each of the plurality of managed devices to be awakened;
sending, by the cloud based management server, a WoL request to an on-premise server associated with each of the plurality of managed devices to be awakened, the WoL request including the MAC address and the IP address of each of the plurality of managed devices; and
in response to receiving the WoL request and for each of the plurality of managed devices:
generating, by the on-premise server, a magic packet that includes the MAC address of the managed device that was provided in the WoL request;
employing, by the on-premise server, the IP address of the managed device that was provided in the WoL request to identify a router in a same subnet as the managed device;
generating, by the on-premise server, an IP packet that contains the magic packet and that specifies a broadcast IP address in the same subnet; and
sending, by the on-premise server, the IP packet containing the magic packet to the identified router thereby causing the identified router to broadcast the magic packet over the same subnet and also causing the corresponding managed device to be awakened.

16. The computer storage media of claim 15, wherein the plurality of managed devices to be awakened comprises a first set of managed devices associated with a first on-premise server and a second set of managed devices associated with a second on-premise server, and
wherein sending the WoL request comprises sending a first WoL request to the first on-premise server and a second WoL request to the second on-premise server.

17. The computer storage media of claim 16, wherein the first WoL request includes the MAC address and IP address of each managed device in the first set and the second WoL request includes the MAC address and the IP address of each managed device in the second set.

18. The computer storage media of claim 15, wherein obtaining the MAC address and the IP address for each of the plurality of managed devices to be awakened comprises accessing device information previously received by the cloud based management server from each of the plurality of managed devices.

19. The computer storage media of claim 15, wherein the router comprises a switch.

* * * * *